US005188848A

United States Patent [19]

Taddei

[11] Patent Number: 5,188,848

[45] Date of Patent: Feb. 23, 1993

[54] DEVICE FOR MAKING EARTHEN BLOCKS

[76] Inventor: Virgile S. Taddei, Avenue Van Volxem 180, 1190, Brussels, Belgium

[21] Appl. No.: 581,519

[22] Filed: Sep. 12, 1990

[30] Foreign Application Priority Data

Sep. 13, 1989 [BE] Belgium ............................ 08900971

[51] Int. Cl.[5] ........................ B29C 31/00; B29C 43/00

[52] U.S. Cl. .................................. 425/147; 264/40.4; 425/256; 425/354; 425/419; 425/421

[58] Field of Search .............. 425/147, 148, 169, 256, 425/260, 352, 354, 355, 412, 416, 419, 421, 424, 448, 456; 264/40.4, 120

[56] References Cited

U.S. PATENT DOCUMENTS

| | | | |
|---|---|---|---|
| 2,449,257 | 9/1948 | Tucker | 425/352 |
| 2,549,642 | 4/1951 | Seelig | 425/352 |
| 3,187,401 | 6/1955 | O'Donnell et al. | 425/103 |
| 3,604,075 | 9/1971 | Locke et al. | 425/148 |
| 3,883,278 | 5/1975 | Hass | 425/421 |
| 3,887,685 | 6/1975 | Stelzmuller | 425/260 |
| 3,898,024 | 8/1975 | Wockener | 425/169 |
| 4,260,346 | 4/1981 | Anderson, Jr. et al. | 425/78 |
| 4,260,352 | 4/1981 | Balhorn | 425/211 |
| 4,534,721 | 8/1985 | Iwasaki et al. | 425/352 |

FOREIGN PATENT DOCUMENTS

| | | |
|---|---|---|
| 91753 | 5/1897 | Fed. Rep. of Germany . |
| 1805405 | 6/1970 | Fed. Rep. of Germany . |
| 2203288 | 8/1973 | Fed. Rep. of Germany . |
| 3332969 | 3/1985 | Fed. Rep. of Germany . |
| 325964 | 5/1903 | France . |
| 192307 | 2/1923 | United Kingdom . |
| 273863 | 7/1927 | United Kingdom . |
| 2025309 | 1/1980 | United Kingdom . |
| 2077957 | 12/1981 | United Kingdom . |
| 8902820 | 4/1989 | World Int. Prop. O. . |

*Primary Examiner*—Jay H. Woo

*Assistant Examiner*—Scott Bushey

*Attorney, Agent, or Firm*—Wood, Phillips, VanSanten, Hoffman and Ertel

[57] ABSTRACT

An apparatus for making earthen blocks and having a hopper, structure for loading the hopper with a compactible material, structure for verifying that the hopper is filled to a predetermined level, structure for moving the hopper to a mold cavity and emptying the contents into the mold cavity, a first press having a first punch to be forced into the mold cavity to compress the material therein and a second press having a second punch that is held in a fixed position until a predetermined force is exerted by the first press, whereupon the second punch follows movement of the first punch.

14 Claims, 4 Drawing Sheets

DEVICE FOR MAKING EARTHEN BLOCKS

TECHNICAL FIELD OF THE INVENTION

This invention relates to a device for making earthen blocks, particularly cold stabilized blocks.

BACKGROUND AND SUMMARY OF THE INVENTION

The present invention relates to a method for making earthen blocks, particularly cold stabilized blocks, comprising the following steps:

filling a mold cavity with a material to be molded, the material comprising at least earth;

applying a first compression force on said material by moving a punch;

driving the walls of the mold cavity by the material to be molded into the same direction as the first compression force while maintaining the first compression force.

The invention relates also to a device for making earthen blocks, particularly cold stabilized blocks, comprising a hopper, a filling unit for filling said hopper with a material to be molded and a means for moving said hopper, for bringing the hopper towards a mold cavity and for emptying the material into said mold cavity. The device further includes a press for compressing said material introduced into the mold cavity and for forming a block of the material. The press includes a first press having a first punch, and also a first means for moving the walls of the mold cavity in the same direction as the first punch.

Such a method and such a device are known from the Belgian Patent No. 877,553. In the known device a hopper is filled with a material to be moulded, particularly a previously mixed material formed by earth or sand, cement and water. The hopper is moved above a mould cavity wherein it is emptied. Then a press with a punch applies pressure to the material introduced into the mold cavity to compress this material and to make a block or a brick of the latter. During the mold operation by compression, the walls of the mold cavity are moved by the driving effect of the mass to be molded, the density of which increases.

A drawback of the method and the device is the driving effect of the mass to be moulded is small and consequently the compression of the material is not realized in an adequate manner. This causes a malformation of the blocks such that the blocks are unusable.

An object of the invention is to realize a method and a device which solves this drawback.

To this end a method according to the invention is characterized in that after the filling step and before applying said first force, a precompression force smaller than the first force is applied to the material to be molded by means of said punch.

A device according to the invention is characterized in that the press comprises second means for applying a precompression force by the first punch smaller than the compression force to the material to be molded.

The precompression allows the material introduced into the mold cavity to set and to eliminate hollows which would have been formed during the filling. When the material has been set by means of the precompression, the energy applied during the compression is better distributed over the whole material and the driving effect of the mass to be molded against the walls of the mold cavity provides a better compression and a more efficient formation of the blocks.

It has to be noted that the application of different compression forces during the manufacture of one single block is described in the French Patent No. 325,964. A method of manufacturing blocks is described wherein a first compression is followed by a big compression is applied. However, the big compression is not applied uniformly onto the two opposed sides of a block and the walls of the mold cavity are driven in an hazardous way which does not allow a uniform compression and adequate control of the compression method. The method according to the present invention is distinguished from the French Patent No. 325,964 because the walls of the mold cavity in the present invention remain motionless during the precompression and are only driven when applying the first compression force. In said French Patent, the walls move during the initial compression and remain motionless during the big compression. The fact that the walls move during the first compression leads to a malformation of the blocks.

A preferred embodiment of a method according to the invention is characterized in that at about the end of said emptying of the hopper, an impulse of compressed air is injected into said hopper. The impulse of compressed air allows a better emptying and a better filling which results in better block formation.

Often the hopper is not filled appropriately because hollows are formed. As a result the hopper is filled insufficiently and an unusable block is created since the block is to fragile due to a lack of homogeneity. In order to remedy this problem a device according to the invention, a verification unit verifies by means of an ultrasonic signal if the hopper has been filled up to a predetermined level. The verification unit omits a control signal in case of an insufficient filling. The verification unit makes it relatively. Moreover, the use of an ultrasonic signal allows control of the filling of the hopper without a measuring element in the hopper. The control signal generated insufficient filling prevents an heterogeneous block.

A preferred embodiment of a device according to the invention is characterized in that the verification unit is connected to the filling unit generates under control of said control signal, a filling signal to the filling unit to activate the latter. This allows further filling when an insufficient amount of material has been introduced into the hopper.

Preferably the verification unit measures the filling level of said hopper and incorporates into said filling signal an indication of how much additional materials is to be added to reach said predetermined level. In this way the amount of material to be added can be determined.

Another preferred embodiment of a device according to the invention is characterized in that said hopper is connected to a vibration unit for vibrating said hopper. In this way, the formation of hollows is avoided.

Preferably the vibration unit includes a needle which vibrates at an ultrasonic frequency. The ultrasonic vibrations eliminate the hollows.

Preferably the blocks made by applying the method according to the invention are nesting blocks having a predetermined height with a tolerance of less than 2%. This allows a construction without jointings and without rough-casting.

The invention will now be described more into detail with reference to the drawings which represent an embodiment of a device according to the invention. It will be clear that the invention is not limited to the illustrated example and that other embodiments are also possible within the scope of the invention.

BRIEF DESCRIPTION OF THE DRAWINGS

In the figures a same reference numeral indicates a same or analogous element.

DETAILED DESCRIPTION OF THE INVENTION

Figure 1:
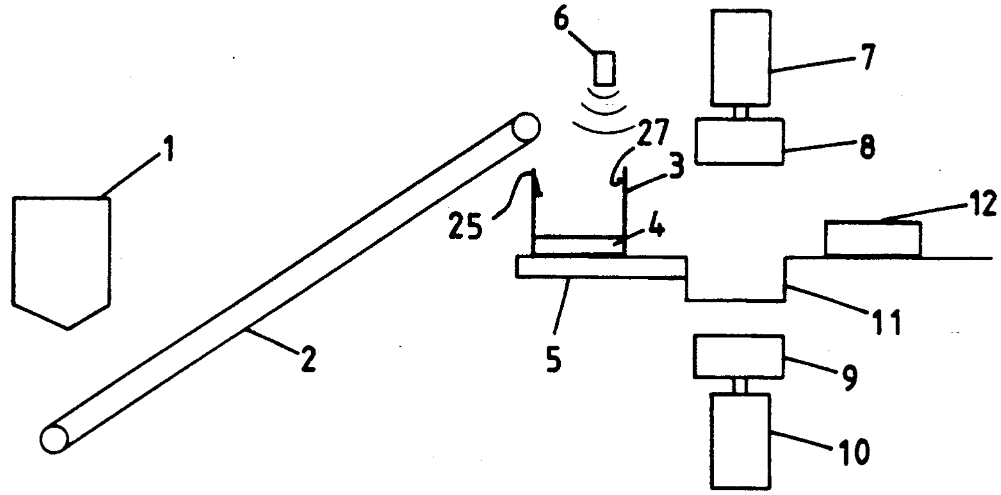
FIG. 1 illustrates schematically an example of a device according to the invention.

FIG. 1 illustrates schematically an example of a device for making earthen blocks according to the invention. Earthen blocks include bricks, tiles or other construction elements manufactured from a molded material comprising amongst others earth, cement and water. Particularly this invention relates to, cold stabilized blocks, i.e. blocks made without baking. The blocks can have different forms, configurations and dimensions. Preferably, the blocks are nesting blocks which allow construction without jointings or rough-casting and they are provided with inner passages for introducing conducts therein. A small percentage of cement, preferably less than 10%, binds the material. The material to be molded is mixed in a mixer 1 which transfers the material to be moulded to a filling unit 2, for example by a conveyor belt. The filling unit moves the material to be molded towards a hopper 3, preferably provided with a clack valve 4. A vibration unit 25 includes a needle which vibrates at an ultrasonic frequency. The needle is mounted in the hopper 3 and vibrates the hopper as well as the material which is present therein. The hopper 3 is mounted on a moving means 5, for example a rail on which a carriage rolls. The carriage can be moved on the rail, for example by means of an engine (not shown). The carriage is thus moved between a filling point situated under an extremity of the conveyor belt 2 and a mold cavity 11.

An ultrasonic detector 6 is mounted above the hopper 3 in the vicinity of said extremity of the conveyor belt 2. This detector is a component of a verification unit which will be described more into detail hereinafter. The ultrasonic detector 6 measures the level of the material in the hopper 3. To this end, the detector 6 emits an ultrasonic signal which is reflected by the material present in the hopper. The time between the emission of a signal and the receipt of the reflected signal indicates the level of the material in the hopper.

When the hopper 3 is situated above the mould cavity 11, the clack valve 4 is activated to open the bottom of the hopper to transfer the material to be molded into the mold cavity 11. The material to be molded is then compressed by a first press 7 with a first punch 8 located above the mold and a second press 10 with a second punch 9 located beneath the mold cavity. The presses are preferably hydraulic presses. When the block 12 has been manufactured, it is removed from the mould cavity, for example by means of the hopper 3 which pushes the block.

It will be clear that the presence of the clack valve 4 on the hopper 3 is a preferred embodiment. It is also possible that the hopper has no bottom and that the surface of the table forms the bottom of the hopper. The material will thus be moved over the table and will fall into the mold cavity 11.

In another embodiment of the device according to the invention, the hopper comprises at least one injector 27 which provides an impulse of compressed air into said hopper. To this end, the injector is connected to a source of compressed air such as a compressor (not shown). The injection of compressed air takes place during the emptying of the hopper and allows material to be removed from the hopper which would otherwise remain stuck to the hopper. To prevent spattering, the compressed air is not continuously injected but pulsed.

Figure 2:
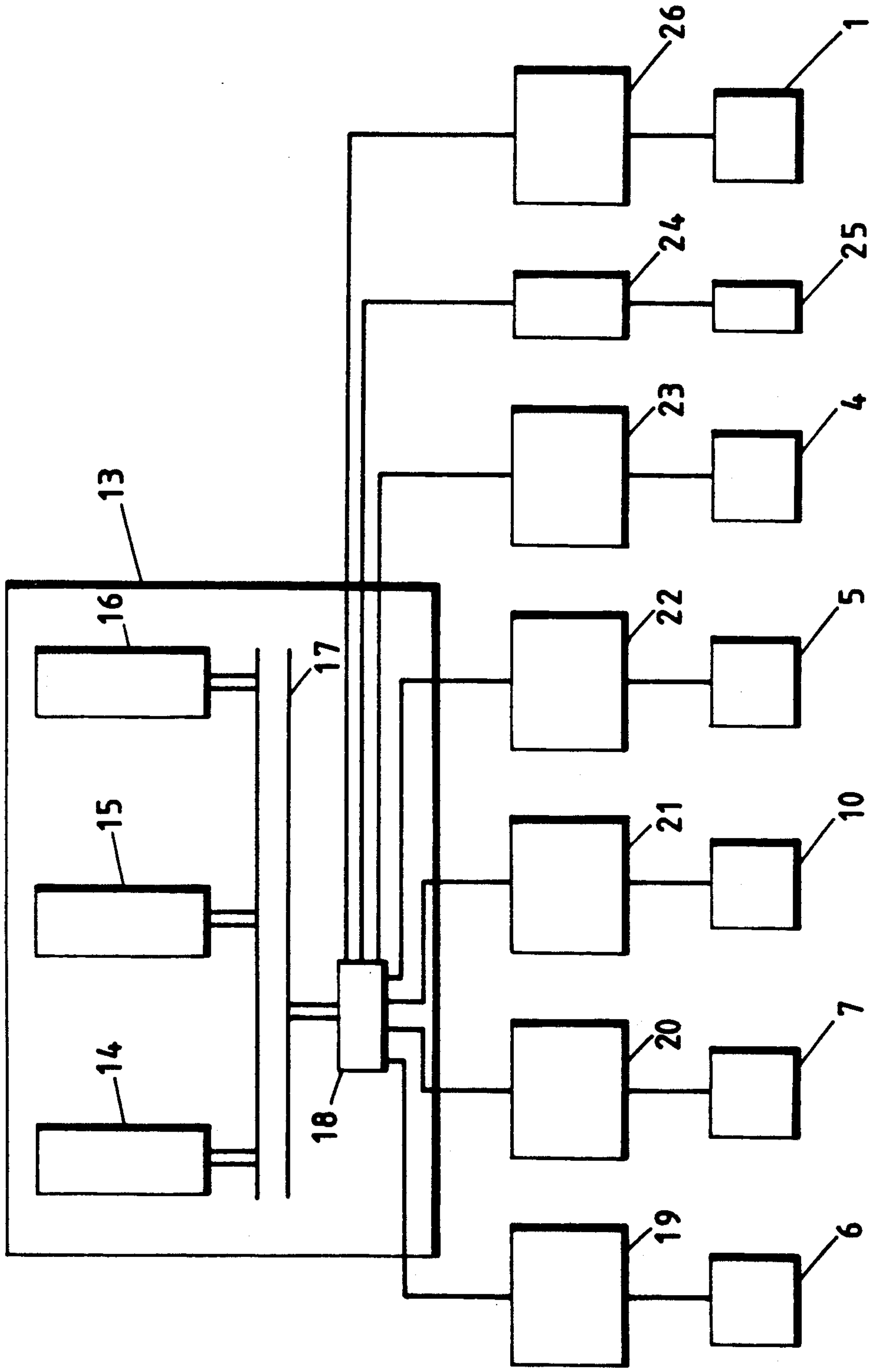
FIG. 2 illustrates schematically a control member for the device according to the invention.

The control of the different movements of the different elements of the device illustrated in FIG. 1 is realized by means of the control member illustrated schematically in FIG. 2. This control member comprises a programmable unit 13, for example a "programmable controller" C20 commercialized by the Company OMRON Tateisi Electronics Co., Osaka 541, Japan. This programmable unit 13 comprises a communication line 17 to which are connected a microprocessor 14, a first memory 15, for example a RAM, and a second memory 16, for example an EPROM. An input/output interface 18 is also connected to the communication line 17. This input/output interface organizes the information exchange between the programmable unit 13 and other elements of the device. The input/output interface 18 is connected to a first control element 19 of the detector 6, to a second and third control element 20, 21 respectively of the first 7 and second presses 7, 10 respectively to a fourth control element 22 of the moving means 5, to a fifth control element 23 of the clack valve 4, to a sixth control element of the vibration unit 25 and finally to a seventh control element 26 of the mixer 1.

Figure 3:
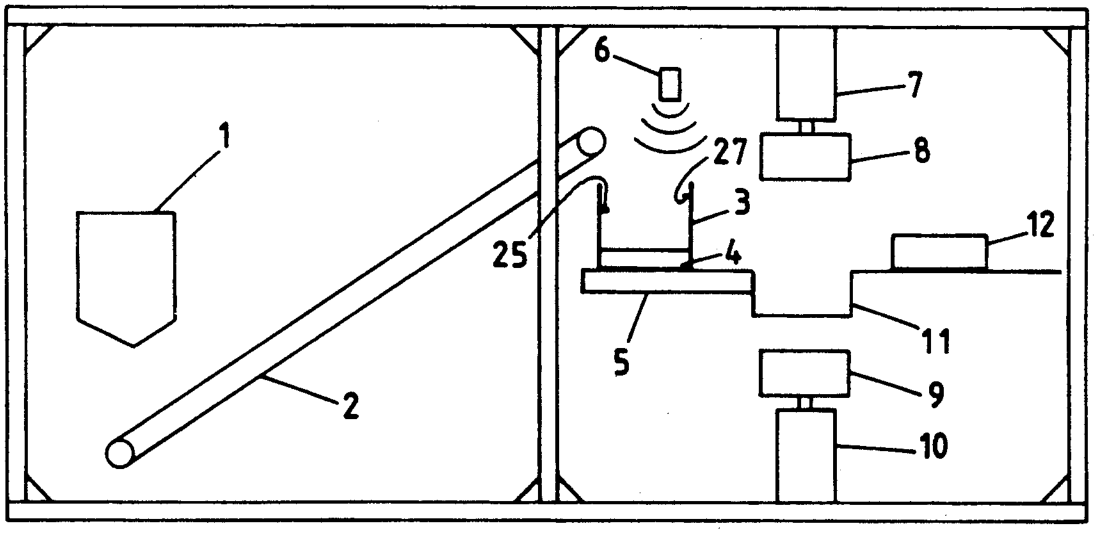
FIG. 3 illustrates a device according to the invention built into a container.

In order to make a displacement of the device according the invention easier and to allow in this way to manufacture earthen blocks at the place itself where they have to be used for constructional purposes, the device is advantageously arranged inside a container. FIG. 3 illustrates a device according to the invention mounted inside a container.

Figure 7:
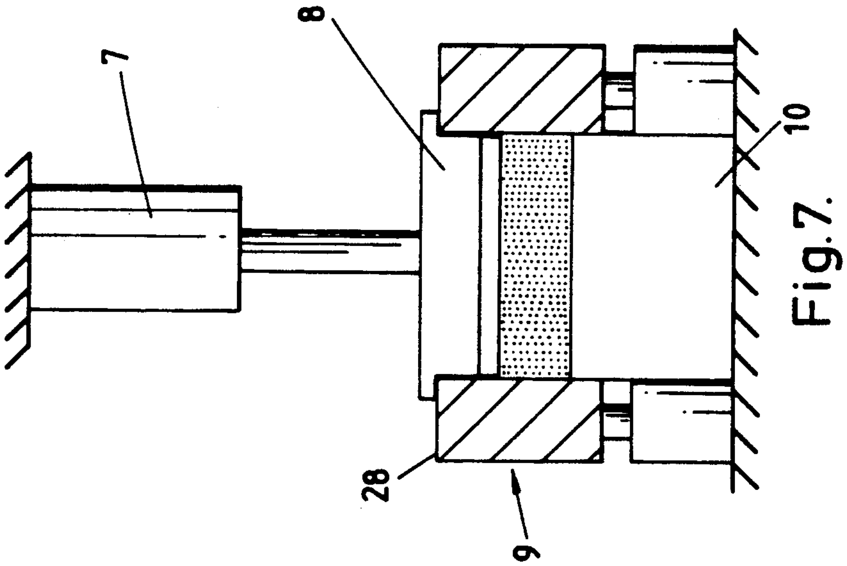
FIGS. 5, 6 and 7 illustrate the different phases of a method according to the invention.
Figure 6:
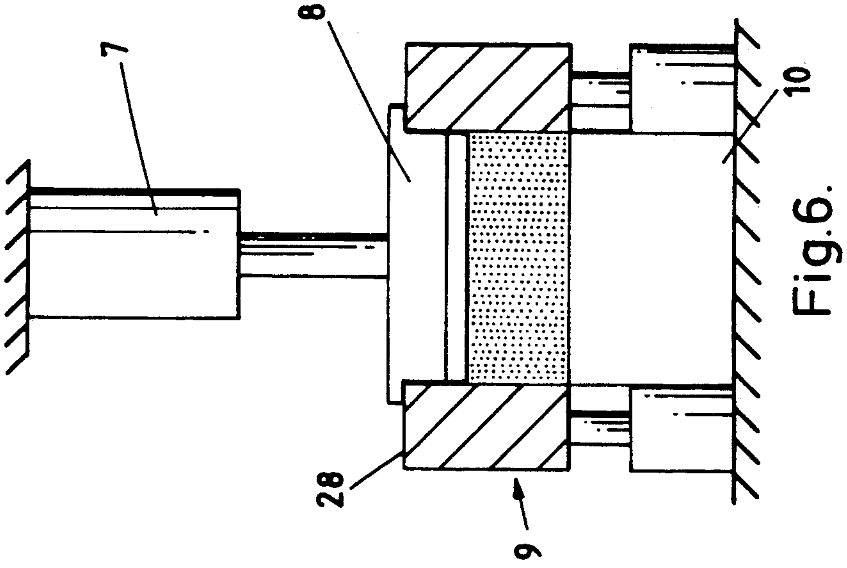
Figure 5:
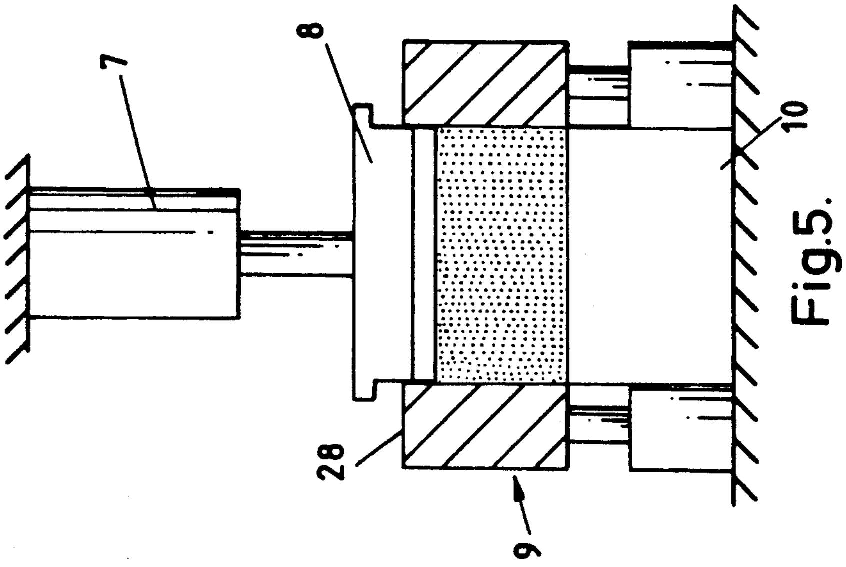

FIGS. 5, 6 and 7 illustrate the different positions of the punch when making earthen blocks. In a first phase, the first punch 8 of the press 7 goes down, preferably soon after the filling of the mold cavity 11. Then, as illustrated in FIG. 5, the first punch 8 applies a precompression force onto the material to be molded so that the first punch 8 goes slightly down into the mold cavity. During this precompression, a force substantially smaller than the one applied during the compression itself is applied. The precompression allows the material to be molded to set.

In a second phase, as illustrated in FIG. 6, the first punch goes further down into the mold cavity while compressing the material to be molded. During this phase, a big compression force, bigger than the one applied during said precompression, is applied. A part of the compression force is distributed over the walls of the mold cavity.

In a third phase illustrated in FIG. 7, the compression is further applied to the material to be molded. During this phase, the table 28 is driven downwards and the first punch goes further down and carries along by means of said material the second punch. The driving of the table is essentially realized by the force applied onto the walls by the compressed material. During the second phase, the table is maintained in position by the second press, for example by clamping the hydraulic jack which controls the movements of the second punch.

When the third phase is achieved, the table goes further down in order to remove the formed block. Then the table goes up again up to a level such as illustrated in FIG. 5. By acting in the way described hereinabove, a double compression is obtained by means of a single unidirectional movement.

Indeed, the friction generated during the first and second phase between grains of the material to be molded causes part of the energy from the compression to be transferred to the vertical walls of the mould cavity. Due to this fact the material present on the bottom of the mould does not receive the complete compression energy since a part of this energy is transferred into the walls of the mold cavity. The double compression of the present invention, allows the use of energy generated for compressing the material contained in the mold cavity in the upper and lower parts of the block to be transferred to the vertical walls of the mold cavity.

When the first punch 8 is going down, the movement of the punch is limited. To this end, an element is provided into the walls of the mold cavity or in the first press which detects a predetermined position of the punch. The element is for example a micro-switch or a photo-electric cell. When the first punch has reached this predetermined position which corresponds to the farthest allowed point of its movement, the element emits a signal which will immediately stop the movement of the first punch and prevent the punch from penetrating further into the material. This allows making blocks having a constant predetermined height with a tolerance smaller than 2%.

When nesting blocks are made it is important that the height of the blocks is substantially constant and that the tolerance is smaller than 2%. Indeed, height variations of the blocks would impede a correct nesting and would result in a non-presentable appearance of the wall constructed in this way. When the blocks have a substantially constant height they can be nested very easily and it is thus not necessary to apply jointings or rough-casting. The double compression and, if it is the case, the control of the movement of the first punch allow to make blocks of a constant height and with a tolerance smaller than 2% since the compression force is uniformly applied onto all the material.

Figure 4:
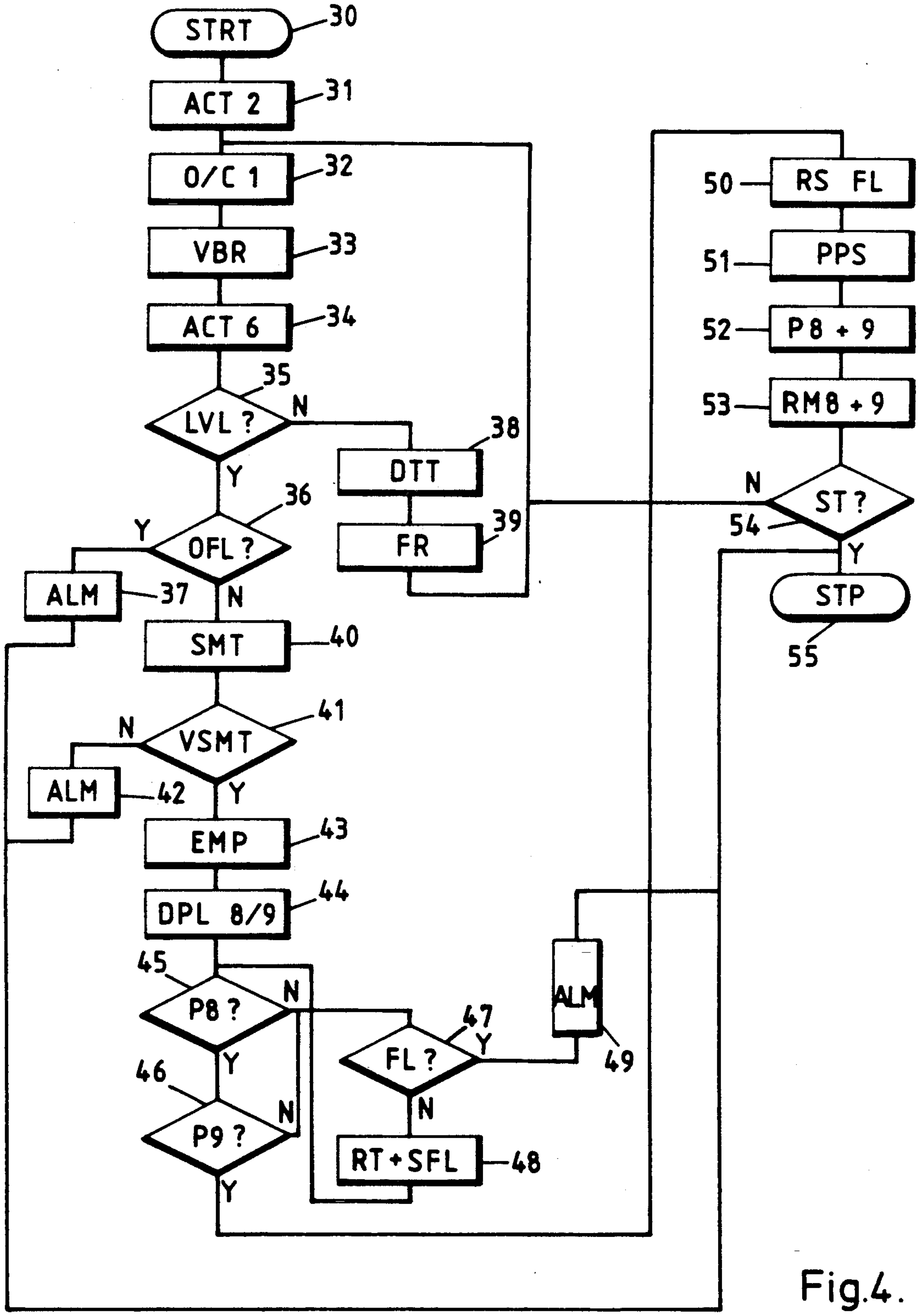
FIG. 4 illustrates by means of a flow chart the functioning of a device according to the invention.

The functioning of the device for making earthen blocks according to the invention will now be described with reference to the flow chart illustrated in FIG. 4. This flow chart represents the important steps of a programme for manufacturing earthen blocks. This programme is for example stored in the EPROM 16 and different control signals are transmitted by the input-/output interface 18 and the different control elements. The different steps will now be described more into details.

30 STRT: This is the start up of the device.

31 ACT 2: The conveyor belt 2 is activated.

32 O/C 1: The mixer 1 is open during the predetermined time period in order to transfer the material to be molded onto the conveyor belt 2. The length of this period is function of the dimension of the block to be made and of the flow rate of the mixer. (Here the filling of the mixer is supposed to be realized in a conventional way).

33 VBR: The material, supplied by the conveyor belt 2 into the hopper 3, is shaken to eliminate possible hollows and to set the material. However this relates to a preferred embodiment of a device according to the invention and not a basic embodiment. The material is shaken either mechanically by making the carriage move, or by vibrating the needle 25 by means of an impulse transmitted by the control element 24. The needle 25 offers the advantage that the carriage need not be moved and that a strong vibration energy is transmitted to the material to eliminate the hollows. In another embodiment, the conveyor belt could transfer material into a funnel which would then supply the hopper.

34 ACT 6: The detector 6 is activated by means of an impulse sent to the control element 19. The detector 6 emits then an ultrasonic wave for measuring the filling level of the hopper 2.

35 LVL?: The filling level of the hopper 3, such as measured by the detector 6, is verified. To this end, the detector 6 verifies the time between the emission of an ultrasonic wave and the reception of the reflected wave. This time is then sent by means of the control unit 19 and the interface 18 to the programmable unit 13. This unit 13 verifies whether this time corresponds to a predetermined time. In case this time is substantially equal or smaller (y) than the predetermined time indicating a predetermined filling level of the hopper, the programme goes to step 36. In the opposite case (N), the programme goes to step 38.

36 OFL?: The programmable unit verifies if said time is smaller then the predetermined time.

37 ALM: If this is the case, an alarm signal is generated indicating that too much material has been introduced into the hopper. The device is then automatically stopped in order to prevent making unusable blocks.

38 DTT: In the case where not enough material has been introduced into the hopper, the programmable unit generates a control signal. Preferably this control signal contains also an indication of the amount of material missing in the hopper. To this end, the programmable unit determines for example the time difference between the time measured by the detector 6 and the predetermined time.

39 FR: The control signal is transformed into a filling signal which is sent by means of the control element 26 to the mixer 1. When said indication has also be determined, it will be transformed into a signal representing the opening time of the mixer which is output to the mixer. In another embodiment, it will the flow rate of the conveyor belt 2 is adjusted by means of the filling signal. After the filling signal has been formed, the program is started again from step 32.

40 SHT: When the hopper is adequately filled, the moving means 5 is activated by means of the control element 22 in order to move the hopper 3 and to bring it above the mould cavity 11.

41 VSHT?: Verifies whether the hopper is situated well above the mold cavity. This is for example realized by means of a detector (not shown in the drawings) which detects the position of the hopper above the mold cavity. When the position detector detects that the hopper is situated above the mould cavity, it sends a signal to the programmable unit 13 which goes then over to step 43.

42 ALM: If the position detector does not provide a signal to the programmable controller within a predetermined time period, an alarm signal is generated and the device is automatically stopped in order to prevent damaging the presses.

43 EMP: The hopper is now emptied by activating the clack valve 4 and the material to be molded falls into the mold cavity 11.

44 DPL 8/9: Punches 8 and 9 of presses 7 and 10 are now displaced in order to allow the compression of the material to be moulded.

45 P8?: It is verified whether the punch 8 is situated in its start position to start the compression.

46 P9?: It is verified whether punch 9 is situated in its start position. The verification of the position of punches 8 and 9 is necessary to apply an equal compression force over the upper and the lower side of the material present in the mould cavity.

47 FL?: It is verified whether a flag has been positioned indicating that a new test of positioning the punches has been carried out.

48 RT+BFL: When the punch 8 respectively 9 are correctly positioned, a new positioning test is carried out and a flag is positioned (one per punch).

49 ALM: When a flag has been positioned and when one or the two punches are still not correctly positioned, an alarm signal is generated and the device is automatically stopped in order to prevent damaging the presses.

50 RS FL: A flag which could have been positioned during step 48 is set back at zero.

51 PPS: A precompression is realized for example by means of the punch 8. This precompression allows the material to set.

52 P8+9: The presses 7 and 10 are activated in order to apply by means of the punch 8 a pressure onto the material to be moulded and to make the table 28 to go down in order to form, by compressing the material, an earthen block. When the device is provided with an element which detects a predetermined position of the punch 8 such as mentioned herein before, the movement of punch 8 is limited. In this case, this element sends a signal to the microprocessor when said position has been reached which causes then the movement of the punch 8 to stop.

53 RM 8+9: The punches 8 and 9 are withdrawn and the block is removed from the mould cavity.

54 ST?: It is verified whether one wants to stop the device, if not the process is started again from step 32.

54 STP: This is the end of the programme.

In order to improve the sliding of the material in the hopper, the inner wall of the latter is advantageously coated with polyethylene.

In order to make the earth flowing better into the hopper and to prevent in this way the formation of hollows, compressed air is advantageously blown into the hopper.

What is claimed is:

1. An apparatus for making earthen blocks, said apparatus comprising:

a hopper;

a filling means for loading the hopper with a compactible material to a predetermined level, said filling means including a means for verifying that said hopper is filled to said predetermined level;

a means for moving the hopper to a mold cavity and for emptying said hopper in said mold cavity;

a first press including a first punch and a first drive means for guidingly moving the first punch forcibly and reciprocatively along a first line into and out of the mold cavity to compress a compactible material contained therein;

said first drive means including a means for selectively exerting a) a precompression force, b) a first compression force in excess of the precompression force, and c) a second compression force in excess of the precompression force;

a second press including a second punch surrounding a fixed base and a second drive means for guidingly moving the second punch along a second line substantially parallel to the first line, there being means for holding the first and second punches during the application of the precompression force and the first compression force and enabling a movement of said second punch during application of said second compression force in a corresponding direction as the first punch, said first punch and said second punch respectively forming a first wall and lateral walls of said mold cavity, said fixed base forming a second wall situated in facing relationship, with said first wall said lateral walls circumscribing said second wall; and cooperating means on said first punch for engaging the second punch during said second compression, said first drive means and said first punch urging said compressible material against said second wall and said lateral walls to create an entrainment force, said cooperating means and said entrainment force engaging said second punch and said lateral walls and driving said second punch and said lateral walls when said second compression force is applied, wherein said verifying means includes a signal generator means and signal receiver means both located above said hopper, the generator means for sending an ultrasonic signal towards said hopper, the receiver means for receiving a reflected ultrasonic signal, said verifying means including a timer for measuring a duration between the sending of the ultrasonic signal by the generator means and the receipt of the signal by the receiver means, said verifying means including means for generating a second control signal in the event that said duration exceeds a predetermined value corresponding to said predetermined level.

2. The apparatus for making earthen blocks of claim 1 wherein the verifying means provides a first control signal when said hopper is filled to said predetermined level.

3. The apparatus for making earthen blocks of claim 2 further including an air injection means responsive to said first control signal for injecting compressed air into said hopper to fully remove a compressible material from said hopper and to discharge compressible material from the hopper into the mold cavity.

4. The apparatus for making earthen blocks of claim 1 wherein said filling means is responsive to said second control signal to continue filling said hopper in the event that said duration exceeds said predetermined value.

5. The apparatus for making earthen blocks of claim 1 further including a means for generating a third control signal indicative of the difference between said predetermined value and the duration, said filler means being responsive to said third control signal to introduce sufficient compactible material to fill said hopper.

6. The apparatus for making earthen locks of claim 1 further including a means for vibrating said hopper to prevent hollows from forming in material in the hopper.

7. The apparatus for making earthen blocks of claim 6 wherein said vibrating means includes a needle which vibrates at an ultrasonic frequency.

8. An apparatus for making earthen blocks, said apparatus comprising:

a hopper;

a filling means for loading the hopper with a compactible material to a predetermined level, said filling means including a means for verifying that the hopper is filled to the predetermined level, said compactible material comprising at least earth;

a means for moving the hopper to a mold cavity and for emptying said hopper in said mold cavity;

a first press including a first punch and a first drive means for guidingly moving the first punch forcibly and reciprocatively along a first line into and out of the mold cavity to compress the compactible material filled therein; and a second punch surrounding a fixed base and a second drive means for guidingly moving the second punch along a second line substantially parallel to the first line, said first punch and said second punch respectively forming a first wall and lateral walls of said mold cavity, said fixed base forming a second wall situated in facing relationship, with said first wall said lateral walls circumscribing said second wall, wherein said means for emptying the hopper includes means for generating an emptying signal upon emptying said hopper, said means for emptying the hopper being connected to air injection means responsive to said emptying signal for injecting compressed air into said hopper to assist the removal of the compressible material from said hopper and to discharge said compressible material into the mold cavity, wherein said filling means includes means for generating a filling signal when said hopper is filled to said predetermined level, said filling means including an ultransonic signal transmission means having an input for receiving said emptying signal and being provided for generating and sending under control of said emptying signal an ultrasonic signal towards said hopper and for receiving a further ultrasonic signal generated upon reflection of said ultrasonic signal by said compactible material, said ultrasonic signal transmission means including a timer for measuring a duration between the sending of the ultrasonic signal and the receipt of the further ultrasonic signal, said ultrasonic signal transmission means being further provided for generating a first control signal if said duration exceeds a predetermined value corresponding to the predetermined filling level of said hopper.

9. The apparatus for making earthen blocks of claim 8 wherein said filling means is responsive to said first control signal to supply a predetermined amount of material to said hopper if said duration exceeds said predetermined value.

10. The apparatus for making earthen blocks of claim 8 further including a means for generating a second control signal proportional indicative of a difference between said predetermined value and the duration, said filler means being responsive to said second control signal to supply to said hopper an amount of compactible material which is proportional to said difference as indicated by said second control signal.

11. The apparatus for making earthen blocks of claim 8 further including a means for vibrating said hopper after filling said hopper.

12. The apparatus for making earthen blocks of claim 1 wherein said vibrating means includes a needle provided for vibrating at an ultrasonic frequency.

13. The apparatus for making earthen blocks of claim 8 wherein said apparatus is housed in a container.

14. An apparatus for making earthen blocks, said apparatus comprising:

a hopper;

a filling means for loading the hopper with a compactible material, said filling means including a means for verifying that the hopper is filled to the predetermined level, said compactible material comprising at least earth;

a means for moving the hopper to a mold cavity and for emptying said hopper in said mold cavity;

a first press including a first punch and a first drive means for guidingly moving the first punch forcibly and reciprocatively along a first line into and out of the mold cavity to compress the compactible material filled therein;

a second punch surrounding a fixed base and a second drive means for guidingly moving the second punch along a second line substantially parallel to the first line, said first punch and said second punch respectively forming a first wall and lateral walls of said mold cavity, said fixed base forming a second wall situated in facing relationship with said first wall said lateral walls circumscribing said second wall; and means for vibrating the hopper to prevent hollows from forming in material in the hopper, said vibrating means including a needle which vibrates at an ultrasonic frequency.

* * * * *